United States Patent
Iwanaga

(10) Patent No.: US 7,252,879 B2
(45) Date of Patent: *Aug. 7, 2007

(54) GAS BARRIER LAMINATE FILM AND METHOD FOR PRODUCING SAME

(75) Inventor: Hiroshi Iwanaga, Minami-ashigara (JP)

(73) Assignee: Fujifilm Corporation, Tokyo (JP)

( * ) Notice: Subject to any disclaimer, the term of this patent is extended or adjusted under 35 U.S.C. 154(b) by 47 days.

This patent is subject to a terminal disclaimer.

(21) Appl. No.: 10/759,139

(22) Filed: Jan. 20, 2004

(65) Prior Publication Data

US 2004/0209090 A1   Oct. 21, 2004

(30) Foreign Application Priority Data

Jan. 20, 2003 (JP) .............................. 2003-010939

(51) Int. Cl.
*B32B 19/02* (2006.01)
*B32B 27/00* (2006.01)

(52) U.S. Cl. ........................ 428/336; 428/337; 428/451
(58) Field of Classification Search ................ 428/451, 428/336, 337
See application file for complete search history.

(56) References Cited

U.S. PATENT DOCUMENTS 6,602,564 B1 * 8/2003 Komori et al. ............ 428/34.9

* cited by examiner

*Primary Examiner*—D. S. Nakarani
(74) *Attorney, Agent, or Firm*—Sughrue Mion, PLLC

(57) ABSTRACT

In a method for producing a gas barrier laminate film comprising the step of applying a mixture containing at least one kind of alkoxysilane, an acid catalyst and a hydrophilic resin to a polymer base film to form a coating layer, the acid catalyst is contained in the mixture in an amount of 0.3 to 5.0 molar equivalents with respect to 1 molar equivalent of the alkoxysilane. There are provided a gas barrier laminate film having superior gas barrier property and a method for producing it.

19 Claims, No Drawings

GAS BARRIER LAMINATE FILM AND METHOD FOR PRODUCING SAME

BACKGROUND OF THE INVENTION

1. Field of the Invention

The present invention relates to a method for producing a gas barrier laminate film and a gas barrier laminate film which can be obtained by the method. The present invention relates to, in particular, a method for producing a gas barrier laminated film suitably used for image display devices using a flexible support such as an organic electroluminescence device (henceforth referred to as "organic EL device") and liquid crystal display device and a gas barrier laminated film which can be obtained by the method.

2. Description of the Background

With the wide spread of personal computers and portable information terminals, the demand for a thin and light electronic display is rapidly increasing. Glass substrates are mainly used in the liquid crystal display devices, which are currently most widely spread, and the organic EL devices, which draw attentions because of its high visibility due to the self-coloring property. However, in view of production of lighter devices, impact resistance, flexibility thereof and so forth, use of flexible plastic substrates as the substrates of liquid crystal display devices and organic EL devices is preferred.

However, plastic substrates have poorer heat resistance and poorer gas barrier property compared with glass substrates. Therefore, they are unsuitable for forming high definition patterns and also suffer from disadvantage of poor durability.

To improve such drawbacks of plastic substrates as described above, various researches have been reported so far. For example, a gas barrier laminate film of which gas barrier property is improved by adding a layered compound to a plastic substrate is known as described in, for example, Japanese Patent Laid-open Publication (KOKAI) No. 2001-205743 (claims 1 to 5, page 3, paragraph [0013] to page 4, paragraph [0022]). However, the gas barrier property of the gas barrier laminate film described in the patent document is insufficient, and further improvement has been desired.

Further, also reported is a gas barrier laminate film of which gas barrier property is improved by coating an organic-inorganic hybrid film using the so-called sol-gel method, in which a metal alkoxysilane is hydrolyzed with an acid or base catalyst and then condensed by dehydration to obtain a metal oxide, as described in, for example, Japanese Patent Laid-open Publication (KOKAI) No. 2000-323273 (page 6, paragraph [0059] to page 7, paragraph [0061]), Japanese Patent Laid-open Publication (KOKAI) No. 2001-277443 (page 2, paragraph [0012] to page 6, paragraph [0056]), and Japanese Patent Laid-open Publication (KOKAI) No. 2000-71396 (page 3, paragraph [0011] to page 6, paragraph [0037]). In the improved gas barrier laminate films described in these patent documents, the amount of the acid catalyst used for the hydrolysis during the formation of the hybrid film is not definitely described, or it is a small amount, i.e., 0.05 molar equivalent or less with respect to the amount of the added alkoxysilane.

When an acid catalyst is used in the aforementioned sol-gel method, the amount of the acid catalyst is generally in the range of 0.0001 to 0.01 molar equivalent with respect to the amount of the added alkoxysilane, as described in, for example, Sakuhana, S., "Science of Sol-gel Method", pp. 17-53, Agune Shofu-sha, published on Aug. 20, 2001. This is because, as described in the document, if the amount of the acid catalyst is increased, metal oxide particles having a large size become likely to be produced, and as a result, produced is a film having a large pore size, which is unsuitable for the production of satisfactory gas barrier laminate films. Therefore, the addition amount of acid catalyst is within the aforementioned range in all of the improved gas barrier laminate films of the above patent documents. Thus, there is a problem that the gas barrier property of the organic-inorganic hybrid film itself in the improved gas barrier laminated films cannot be considered sufficient.

Furthermore, examples of use of an acidic cation exchange resin as the hydrolysis catalyst is also reported in, for example, Japanese Patent Laid-open Publication (KOKAI) No. 2002-60525 (page 3, paragraph [0020], page 4, paragraph [0025] to paragraph [0035]). If an acidic cation exchange resin is used as described in this patent document, there may be caused a reaction similar to that caused with an acid catalyst used at a locally high concentration. However, the reaction time of the reaction caused between the solid phase and liquid phase is prolonged, and moreover, a heterogeneous reaction system is used. Therefore, the method suffers from a drawback that a film exhibiting sufficiently uniform and high gas barrier property cannot be obtained.

SUMMARY OF THE INVENTION

The present invention was accomplished in view of the aforementioned problems, and an object of the present invention is to provide a method for producing a transparent gas barrier laminate film having superior gas barrier property. Another object of the present invention is to provide a gas barrier laminate film obtained by the method, a substrate comprising the gas barrier laminate film and a highly definite and highly durable image display device using a flexible support.

In order to obtain superior gas barrier property, it is indispensable to produce a dense thin film, and the inventors of the present invention conducted various researches about means for obtaining a dense thin film by using the sol-gel method. As a result, the inventors of the present invention found that while it had been considered preferable to use an acid catalyst in an amount of 0.01 molar equivalent or less in the conventional sol-gel methods for forming a dense film, it was true when a metal alkoxide was used alone, and it was not necessary to use an acid catalyst in an amount of 0.01 molar equivalent or less if a polymer existed together. Further, they found that a dense thin film produced by using such an amount of acid catalyst had a predetermined silicon density.

The present invention was accomplished based on the results of the inventors' investigations, and the objects of the present invention are attained by the following means.

(1) A method for producing a gas barrier laminate film comprising the step of applying a mixture containing at least one kind of alkoxysilane, an acid catalyst and a hydrophilic resin to a polymer base film to form a coating layer, wherein the acid catalyst is contained in the mixture in an amount of 0.3 to 5.0 molar equivalents with respect to 1 molar equivalent of the alkoxysilane.

(2) The method for producing a gas barrier laminate film according to (1), wherein the hydrophilic resin is a polyvinyl alcohol resin.

(3) The method for producing a gas barrier laminate film according to (1) or (2), wherein the hydrophilic resin is contained in the mixture in an amount of 0.1 time or more of the weight of $SiO_2$ in the same molar number as the alkoxysilane.

(4) The method for producing a gas barrier laminate film according to any one of (1) to (3), which is a method for producing a gas barrier laminate film comprising a coating layer containing a hydrophilic resin and polysilicate coated on a polymer base film, and wherein the coating layer contains the hydrophilic resin in an amount of 0.23 time or more of the weight of silicon contained in the coating layer.

(5) The method for producing a gas barrier laminate film according to any one of (1) to (4), wherein the coating layer has a silicon density of 0.65 g/cm$^3$ or more at 25° C.

(6) The method for producing a gas barrier laminate film according to any one of (1) to (5), wherein the coating layer has a silicon density of 0.75 g/cm$^3$ or more at 25° C.

(7) The method for producing a gas barrier laminate film according to any one of (1) to (6), wherein the polymer base film is prepared by using a film material resin kneaded with an inorganic layered compound.

(8) A gas barrier laminate film, which can be obtained by the production method according to any one of (1) to (7).

(9) The gas barrier laminate film according to (8), wherein the polymer base film has a light transmission of 80% or more.

(10) A substrate comprising the gas barrier laminate film according to (8) or (9).

(11) An image display device comprising the gas barrier laminate film according to (8) or (9) or the substrate according to (10).

(12) A liquid crystal display device comprising the gas barrier laminate film according to (8) or (9) or the substrate according to (10).

(13) An organic electroluminescence device comprising the gas barrier laminate film according to (8) or (9) or the substrate according to (10).

BEST MODE FOR CARRYING OUT THE INVENTION

Hereafter, the method for producing a gas barrier laminate film of the present invention and the gas barrier laminate film that can be obtained by the method will be explained in detail.

[Method for Producing Gas Barrier Laminate Film and Gas Barrier Laminate Film]

<Polymer Base Film>

The gas barrier laminate film obtained by the production method of the present invention is used for image display devices such as organic EL devices described later. Therefore, the polymer base film used in the present invention is preferably a transparent base film, i.e., a base film having a light transmission of 80% or more, preferably 85% or more, more preferably 90% or more. If the base film has a light transmission of 80% or more, it can be suitably used as a base film of organic EL devices described later.

The light transmission used as an index of transparency in this specification can be measured by the method described in JIS-K7105, i.e., by measuring a total light transmission and scattering light amount using an integrating sphere type light transmission measurement apparatus and subtracting the scattering light transmission from the total light transmission.

The material resin used for the aforementioned polymer base film (henceforth referred to as "film material resin") is preferably a material that can become a transparent film having a glass transition temperature (Tg) of 100° C. or higher and a linear thermal expansion coefficient of 40 ppm/° C. or lower. Examples of such a film material resin include, for example, polyethylene naphthalate (Tg: 115° C.), polycarbonate (Tg: 160° C.), cycloolefin polymer (Tg: 163° C., for example), polyalylate (Tg: 193° C.), polyethersulfone (Tg: 225° C.) and so forth.

The aforementioned film material resins except for polyethylene naphthalate have a slightly high linear thermal expansion coefficient. Therefore, the aforementioned film material resins preferably contain an inorganic layered compound in a cleaved state in order to reduce the linear thermal expansion coefficient.

Only one kind of inorganic layered compound may be used, or two or more kinds of such compounds may be optionally mixed. As the inorganic layered compound, clay minerals having swelling property and/or cleavage property, hydrotalcite compounds and other similar compounds are particularly preferably used.

More specific examples of such clay minerals includes kaolinite, dickite, nacrite, halloysite, antigorite, chrysotile, pyrophyllite, montmorillonite, beidellite, nontronite, saponite, sauconite, stevensite, hectorite, tetrasilylic mica, sodium taeniolite, muscovite, margarite, talc, vermiculite, phlogopite, xanthophyllite, chlorite and so forth.

Further, not only natural clay minerals, but also synthetically produced clay minerals can be preferably used. In particular, synthetic fluorine tetrasilicon mica known as a swellable mica is preferred because of its high aspect ratio after swelling and cleavage, which results in greater effect.

In the present invention, there can also be preferably used inorganic layered compounds (for example, layered silicates) in which cations (sodium, potassium, lithium etc.) carried between layers thereof are replaced with organic cations (henceforth referred to as "organophilization").

Although the cation exchange capacity (CEC) of the inorganic layered compound is not particularly limited, it is preferably 25 to 200 meq/100 g, more preferably 50 to 150 meq/100 g. If the cation exchange capacity of the inorganic layered compound is less than 25 meq/100 g, the amount of cationic substances inserted (intercalated) between the layers of the inorganic layered compound by ion exchange decreases, and therefore sufficient organophilization may not be achieved between the layers. On the other hand, if the cation exchange capacity exceeds 200 meq/100 g, bonding strength between the layers of the inorganic layered compound may become too strong, and thus crystal flakes become unlikely to delaminate, which results in degradation of dispersibility.

As the organic cations used, alkylammonium ions containing a long-chain alkyl group are preferred. Examples thereof include tetrabutylammonium ion, tetrahexylammonium ion, dihexyldimethylammonium ion, dioctyldimethylammonium ion, hexyltrimethylammonium ion, octyltrimethylammonium ion, dodecyltrimethylammonium ion, hexadecyltrimethylammonium ion, octadecyltrimethylammonium ion, dioctadecyldimethylammonium ion, docosenyltrimethylammonium ion, hexadecyltrimethylammonium ion, tetradecyldimethylbenzylammonium ion, octadecyldimethylbenzylammonium ion, dioleyldimethylammonium ion, polyoxyethylene dodecylmonomethylammonium ion and so forth.

As a method for organophilizing the inorganic layered compound, a wet method is generally used. That is, an inorganic layered compound is sufficiently solvated with water, alcohol or the like, then added with organic cations and stirred so that organic cations should substitute for metal ions between layers in the inorganic layered compound. Then, unsubstituted organic cations are sufficiently washed off, and the compound is taken by filtration and dried. In addition, it is also possible that the inorganic layered compound and organic cations are directly reacted in an organic solvent, or the inorganic layered compound and organic cations are reacted by heating and kneading them in the presence of a resin or the like in an extruder.

In the present invention, by melt-kneading the layered compound made organic obtained as described above and the objective film material resin, or mixing them in a solution, a film composition in which the inorganic layered compound in a cleaved state is dispersed in the resin (polymer composition before formation of the polymer base film of the present invention) can be obtained. Among these methods, the melt-kneading method is preferred in view of the process and costs. Further, as the melt-kneading apparatus, kneading apparatuses generally used for thermoplastic resins can be used. For example, single or double screw kneading extruder, roller, Banbury mixer and so forth may be used.

When the inorganic layered compound or organophilized layered compound is added to the polymer base film, the content ratio of the inorganic layered compound or organophilized layered compound and the film material resin is preferably 1/100 to 100/20, more preferably 5/100 to 100/50, in terms of a weight ratio. If the content of the inorganic layered compound and organophilized layered compound is less than 1 part by weight to 100 parts by weight of the film material, heat-resistance may not be exerted. On the other hand, if the content of the film material is less than 20 parts by weight to 100 parts by weight of the inorganic layered compound and organophilized layered compound, transparency and mechanical property (flexibility) may be degraded.

The aforementioned resin composition can be made into a film by usual melt-extruding method, calendering method, solution casting method or the like. Further, this film can also be monoaxially or biaxially stretched. The film surface may be subjected to corona discharge treatment, glow discharge treatment, UV treatment, plasma treatment or the like to improve adhesion with a coating layer. An anchor layer may also be provided.

<Mixture Containing alkoxysilane, Acid Catalyst and Hydrophilic Resin>

In the production method of the present invention, a mixture containing at least one kind of alkoxysilane, an acid catalyst and a hydrophilic resin is applied to the polymer base film to form a coating layer.

In the production method of the present invention, the alkoxysilane is hydrolyzed and polycondensed preferably by the sol-gel method in the mixture containing at least one kind of alkoxysilane, acid catalyst and hydrophilic resin or in the coated film to obtain a hydrolysis and condensation polymerization product of the alkoxysilane (polysilicate) and thereby form a coating layer as a dense thin film.

(Alkoxysilane)

For example, the alkoxysilanes used in the production method of the present invention are preferably those represented by the following formula.

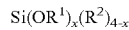

$$Si(OR^1)_x(R^2)_{4-x}$$

In the above formula, $R^1$ preferably represents an alkyl group having 1 to 5 carbon atoms or an acyl group having 1 to 4 carbon atoms. Examples include, for example, methyl group, ethyl group, n-propyl group, isopropyl group, n-butyl group, sec-butyl group, tert-butyl group, acetyl group and so forth. $R^2$ preferably represents an organic group having 1 to 10 carbon atoms. Examples include, for example, unsubstituted hydrocarbon groups such as methyl group, ethyl group, n-propyl group, isopropyl group, n-butyl group, tert-butyl group, n-hexyl group, cyclohexyl group, n-octyl group, tert-octyl group, n-decyl group, phenyl group, vinyl group and allyl group and substituted hydrocarbon groups such as γ-chloropropyl group, $CF_3CH_2$—, $CF_3CH_2CH_2$—, $C_2F_5CH_2CH_2$—, $C_3F_7CH_2CH_2CH_2$—, $CF_3OCH_2CH_2CH_2$—, $C_2F_5OCH_2CH_2CH_2$—, $C_3F_7OCH_2CH_2CH_2$—, $(CF_3)_2CHOCH_2CH_2CH_2$—, $C_4F_9CH_2OCH_2CH_2CH_2$—, 3-(perfluorocyclohexyloxy)propyl group, $(CF_2)_4CH_2OCH_2CH_2CH_2$—, $H(CF_2)_4CH_2CH_2CH_2$—, γ-glycidoxypropyl group, γ-mercaptopropyl group, 3,4-epoxycyclohexylethyl group and γ-methacryloyloxypropyl group. X is preferably an integer of 2 to 4.

Specific examples of these alkoxysilanes are mentioned below.

Examples of the compounds where x=4 include tetramethoxysilane, tetraethoxysilane, tetra-n-propoxysilane, tetraisopropoxysilane, tetra-n-butoxysilane, tetraacetoxysilane and so forth.

Examples of the compounds where x=3 include methyltrimethoxysilane, methyltriethoxysilane, ethyltrimethoxysilane, ethyltriethoxysilane, n-propyltrimethoxysilane, n-propyltriethoxysilane, isopropyltrimethoxysilane, isopropyltriethoxysilane, γ-chloropropyltrimethoxysilane, γ-chloropropyltriethoxysilane, γ-glycidoxypropyltrimethoxysilane, γ-glycidoxypropyltriethoxysilane, γ-methacryloyloxypropyltrimethoxysilane, γ-mercaptopropyltriethoxysilane, phenyltrimethoxysilane, vinyltriethoxysilane, 3,4-epoxycyclohexylethyltrimethoxysilane, 3,4-epoxycyclohexylethyltriethoxysilane, $CF_3CH_2CH_2Si(OCH_3)_3$, $C_2F_5CH_2CH_2Si(OCH_3)3$, $C_2F_5OCH_2CH_2CH_2Si(OCH_3)_3$, $C_3F_7OCH_2CH_2CH_2Si(OC_2H_5)3$, $(CF_3)_2CHOCH_2CH_2CH_2Si(OCH_3)_3$, $C_4F_9CH_2OCH_2CH_2CH_2Si(OCH_3)_3$, $H(CF_2)_4CH_2OCH_2CH_2CH_2Si(OCH_3)_3$, 3-(perfluorocyclohexyloxy)propyltrimethoxysilane and so forth.

Examples of the compounds where x=2 include dimethyldimethoxysilane, dimethyldiethoxysilane, methylphenyldimethoxysilane, diethyldimethoxysilane, diethyldiethoxysilane, di-n-propyldimethoxysilane, di-n-propyldiethoxysilane, diisopropyldimethoxysilane, diisopropyldiethoxysilane, diphenyldimethoxysilane, divinyldiethoxysilane, $(CF_3CH_2CH_2)_2Si(OCH_3)_2$, $(C_3F_7OCH_2CH_2CH_2)_2Si(OCH_3)_2$, $[H(CF_2)_6CH_2OCH_2CH_2CH_2]_2Si(OCH_3)_2$, $(C_2F_5CH_2CH_2)_2Si(OCH_3)_2$ and so forth.

In the production method of the present invention, other metal alkoxides may be used together with the aforementioned alkoxysilanes. As the other metal alkoxides, for example, zirconium alkoxides, titanium alkoxides, aluminum alkoxides and so forth are preferably used.

(Acid Catalyst)

The acid catalyst used for the hydrolysis of the aforementioned alxoxysilans is suitably an inorganic acid or organic acid. Examples of the inorganic acid include hydrochloric acid, hydrogen bromide, hydrogen iodide, sulfuric acid, sulfurous acid, nitric acid, nitrous acid, phosphoric acid, phosphorous acid and so forth. Examples of the organic acid include carboxylic acids (formic acid, acetic acid, propionic acid, butyric acid, succinic acid, cyclohexanecarboxylic acid, octanoic acid, maleic acid, 2-chloropropionic acid, cyanoacetic acid, trifluoroacetic acid, perfluorooctanoic acid, benzoic acid, pentafluorobenzoic acid, phthalic acid, oxalic acid etc.), sulfonic acids (methanesulfonic acid, ethanesulfonic acid, trifluoromethanesulfonic acid, p-toluenesulfonic acid, pentafluorobenzenesulfonic acid etc.), phosphoric acids and phosphonic acids (phosphoric acid dimethyl ester, phenylphosphonic acid etc.), Lewis acids (boron trifluoride etherate, scandium triflate, alkyltitanic acid, aluminic acid etc.), heteropolyacids (phosphomolybdic acid, phosphotungstic acid etc.) and so forth. If a salt remains in the formed coating layer, it is not preferred for the gas barrier property. Therefore, preferred are volatile acids such as hydrochloric acid and nitric acid and acids which react with alkoxysilanes to form a volatile ester compound such as formic acid, acetic acid and oxalic acid.

In the production method of the present invention, the amount of the acid catalyst in the aforementioned mixture is 0.3 to 5.0 molar equivalents, preferably 0.5 to 2.5 molar equivalents, per 1 molar equivalent of the alkoxysilane (if another metal alkoxide is used, alkoxysilane+other metal alkoxide). If the amount of the acid catalyst is more than 0.3 molar equivalent with respect to 1 molar equivalent of the alkoxysilane, all the alkoxyl groups can be hydrolyzed in a comparatively short time. On the other hand, if the amount of the acid catalyst is 5 molar equivalents or less, the amount of silanol groups remaining in the coating layer does not increase, and thus degradation of gas barrier property due to the increase of silanol groups is not caused.

As described in Non-patent document 1, in the conventional methods, if the acid catalyst is used in an amount exceeding 0.01 molar equivalent with respect to 1 molar equivalent of the alkoxysilane, the particle size of the metal oxide in the coating layer becomes large. As a result, a film having a large pore size is obtained, and thus favorable gas barrier property cannot be obtained.

However, in the production method of the present invention, even if the acid catalyst is added in an amount larger than those conventionally used, the particle size of the metal oxide does not become large, because the hydrophilic resin to be explained later is used together with the alkoxysilane. Furthermore, there is also an advantage that the reaction time can be shortened by using a large amount of the acid catalyst.

Moreover, in the production method of the present invention, a sol-gel catalyst can also be used together, besides the aforementioned acid catalyst, Examples of such a catalyst include, for example, the followings.

(1) Metal Chelate Compounds

Metal chelate compounds having a metal as the center metal and an alcohol represented by the formula $R^3OH$ (wherein $R^3$ represents an alkyl group having 1 to 6 carbon atoms) and a diketone represented as $R^4COCH_2COR^5$ (wherein $R^4$ represents an alkyl group having 1 to 6 carbon atoms, and $R^5$ represents an alkyl group having 1 to 5 carbon atoms or an alkoxy group having 1 to 16 carbon atoms) as ligands can be suitably used without any particular limitation. Two or more kinds of metal chelate compounds may be used in combination so long as they are in this category. Those having Al, Ti or Zr as the center metal are particularly preferred as the metal chelate compounds of the present invention. Those selected from a group of compounds represented by the formulas $Zr(OR^3)_{p1}(R^4COCHCOR^5)_{p2}$, $Ti(OR^3)_{q1}(R^4COCHCOR^5)_{q2}$ and $Al(OR^3)_{r1}(R^4COCHCOR^5)_{r2}$ are preferred, and they have an action of promoting the condensation reaction.

$R^3$ and $R^4$ in the aforementioned metal chelate compounds may be identical or different, and represent an alkyl group having 1 to 6 carbon atoms, specifically, ethyl group, n-propyl group, isopropyl group, n-butyl group, sec-butyl group, tert-butyl group, n-pentyl group, phenyl group or the like. In addition to the aforementioned alkyl groups having 1 to 6 carbon atoms, $R^5$ also represents an alkoxy group having 1 to 16 carbon atoms, for example, methoxy group, ethoxy group, n-propoxy group, isopropoxy group, n-butoxy group, sec-butoxy group, tert-butoxy group, lauryl group, stearyl group or the like. In the metal chelate compounds, p1, p2, q1, q2, r1 and r2 are integers determined so as to obtain quadridentate or hexadentate ligands.

Specific examples of the metal chelate compounds include zirconium chelate compounds such as tri-n-butoxy (ethyl acetoacetate) zirconium, di-n-butoxy.bis(ethyl acetoacetate) zirconium, n-butoxy.tris(ethyl acetoacetate) zirconium, tetrakis(n-propyl acetoacetate) zirconium, tetrakis(acetyl acetoacetate) zirconium and tetrakis(ethyl acetoacetate) zirconium; titanium chelate compounds such as diisopropoxy.bis(ethyl acetoacetate) titanium, diisopropoxy.bis(acetyl acetate) titanium and diisopropoxy.bis(acetylacetone) titanium; aluminum chelate compounds such as diisopropoxy(ethyl acetoacetate) aluminum, diisopropoxy(acetyl acetonate) aluminum, isopropoxy.bis(ethyl acetoacetate) aluminum, isopropoxy.bis(acetyl acetonate) aluminum, tris(ethyl acetoacetate) aluminum, tris(acetyl acetonate) aluminum and monoacetyl acetonate.bis(ethyl acetoacetate) aluminum and so forth. Among these metal chelate compounds, tri-n-butoxy(ethyl acetoacetate) zirconium, diisopropoxy-bis(acetyl acetonate) titanium, diisopropoxy(ethyl acetoacetate) aluminum and tris(ethyl acetoacetate) aluminum are preferred. One kind of these metal chelate compounds can solely be used, or two or more kinds thereof can be used in combination. Further, partial hydrolysates of these metal chelate compounds can also be used.

(2) Organic Metal Compounds

Although preferred organic metal compounds are not particularly limited, organic transition metal compounds are preferred because of their high activity. Among these, tin compounds are particularly preferred since their stability and activity are favorable. Specific examples of these compounds include organic tin compounds including carboxylic acid type organic tin compounds such as $(C_4H_9)_2Sn(OCOC_{11}H_{23})_2$, $(C_4H_9)_2Sn(OCOCH=CHCOOC_4H_9)_2$, $(C_8H_{17})_2Sn(OCOC_{11}H_{23})_2$, $(C_8H_{17})_2Sn(OCOCH=CHCOOC_4H_9)_2$ and $Sn(OCOCC_9H_{17})_2$; mercaptide type or sulfide type organic tin compounds such as $(C_4H_9)_2Sn(SCH_2COOC_8H_{17})_2$, $(C_8H_{17})_2Sn(SCH_2CH_2COOC_8H_{17})_2$, $(C_8H_{17})_2Sn(SCH_2COOC_{12}H_{25})_2$,

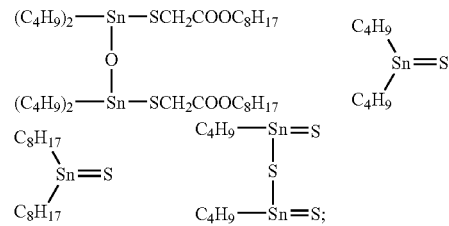

$(C_4H_9)_2SnO$, $(C_8H_{17})_2SnO$ and reaction products of an organic tin oxide such as $(C_4H_9)_2SnO$ and $(C_8H_{17})_2SnO$ and an ester compound such as ethyl silicate, dimethyl maleate, diethyl maleate and dioctyl phthalate, and so forth.

(3) Metal Salts

As the metal salts, alkaline metal salts of organic acids (for example, sodium naphthenate, potassium naphthenate, sodium octanoate, sodium 2-ethylhexanoate, potassium laurate etc.) are preferably used.

The content of the sol-gel catalyst compound in the mixture used in the present invention is 0.01 to 50% by weight, preferably 0.1 to 50% by weight, more preferably 0.5 to 10% by weight, based on the content of the alkoxysilane.

In the production method of the present invention, after the hydrolysis of the alkoxysilane, a basic compound such as an inorganic base or amine may be added to adjust pH of the solution to a value around neutral and thereby promote the condensation polymerization. However, to prevent degradation of the gas barrier property of the coating layer due to formation and remaining of a salt in the coating layer, they are desirably used in combination with an acid catalyst which can form a volatile acid or a volatile ester compound, or they are desirably used, after the aforementioned acids are evaporated, by overcoating the basic compound or immersing the coating layer in a solution containing the basic compound to promote the condensation polymerization.

Examples of the inorganic base include, for example, sodium hydroxide, potassium hydroxide, calcium hydroxide, magnesium hydroxide, aluminum hydroxide, ammonia and so forth. Examples of the organic base compounds include amines (ethylenediamine, diethylenetriamine, triethylenetetramine, tetraethylenepentamine, triethylamine, dibutylamine, N,N-dimethylbenzylamine, tetramethylethylenediamine, piperidine, piperazine, morpholine, ethanolamine, diazabicycloundecene, quinuclidine, aniline, pyridine etc.) and phosphines (triphenylphosphine, trimethylphosphine etc.).

Further, it is also preferable to use, after the hydrolysis with the acid catalyst, amines represented by the following formula.

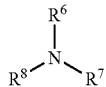

In the above formula, $R^6$ and $R^7$ each independently represent hydrogen atom, an aliphatic group, an acyl group, an aliphatic oxycarbonyl group, an aromatic oxycarbonyl group, an aliphatic sulfonyl group or an aromatic sulfonyl group, and $R^8$ represents an aromatic oxy group, an aliphatic thio group, an aromatic thio group, an acyloxy group, an aliphatic oxycarbonyloxy group, an aromatic oxycarbonyloxy group, a substituted amino group, a heterocyclic group or hydroxy group. However, when $R^8$ is not an aromatic group, either one of $R^6$ or $R^7$ or the both represent hydrogen atom.

The amount of the amine is suitably an equimolar amount to 2 times in mole, preferably an equimolar amount to 1.2 times in mole, of the acid remaining in the coating layer at the time of adding the amine. The amount of remaining acid can be determined by carrying out pH titration of a dispersion in water obtained by dispersing a certain amount of a sample of the coating layer cut or delaminated and subjected to freeze grinding.

Hereafter, solvents used in the sol-gel reaction will be explained. The solvents allow all ingredients in the sol solution to be uniformly mixed and thereby make it possible to prepare solid matter in the formed coating layer, use various coating methods, and improve dispersion stability and storage stability of the formed coating layer. These solvents are not particularly limited so long as they can achieve the aforementioned objects. Preferred examples of the solvents include, for example, water and organic-solvents showing high water-miscibility.

Examples thereof include tetrahydrofuran, dimethoxyethane, formic acid, acetic acid, methyl acetate, alcohols (methanol, ethanol, n-propyl alcohol, isopropyl alcohol, tert-butyl alcohol), ethylene glycol, diethylene glycol, triethylene glycol, ethylene glycol monobutyl ether, acetic acid ethylene glycol monoethyl ether, acetone, N,N-dimethylformamide, N,N-dimethylacetamide, dimethyl sulfoxide and so forth.

In the production method of the present invention, in order to control the sol-gel reaction rate, organic compounds that can constitute multidentate ligands may further be added to stabilize the metal alkoxide. Examples thereof include β-diketones and/or β-ketoesters and alkanolamines.

Specific examples of the β-diketones and/or β-ketoesters include acetylacetone, methyl acetoacetate, ethyl acetoacetate, n-propyl acetoacetate, isopropyl acetoacetate, n-butyl acetoacetate, sec-butyl acetoacetate, tert-butyl acetoacetate, 2,4-hexanedione, 2,4-heptanedione, 3,5-heptanedione, 2,4-octanedione, 2,4-nonanedione, 5-methylhexanedione and so forth. Among these, ethyl acetoacetate and acetylacetone are preferred, and acetylacetone is particularly preferred. One kind of these β-diketones and/or β-ketoesters can solely be used, or two or more kinds of these can be used as a mixture.

When the aforementioned metal chelate compounds are used as sol-gel catalysts, these compounds that can be multidentate ligands can also be used to control the reaction rate.

(Hydrophilic Resin)

Hereafter, the hydrophilic resin used in the production method of the present invention will be explained. The hydrophilic resin used together with the alkoxysilane in the sol-gel reaction is not particularly limited so long as a resin is selected which is dissolved in the solvent used for the sol-gel reaction (water or a mixed solvent with water) Examples of the hydrophilic resin include, for example, polyvinyl alcohol resins, poly(2-methyl-2-oxazoline) resins, poly(N-vinylpyrrolidone) resins, poly(N,N-dimethylacrylamide) resins, gelatin and so forth, and polyvinyl alcohol resins are preferably used.

Although the aforementioned polyvinyl alcohol resins may consist solely of polyvinyl alcohol, they may be blends with a copolymer with a polymer having a hydrogen bond-forming group. Examples of resins having a hydrogen bond-forming group include, for example, resins having a hydroxyl group and derivatives thereof (polyvinyl acetal, phenol resin, methylol melamine etc. and derivatives thereof); resins having a carboxyl group and derivatives thereof (homopolymers or copolymers containing units of a polymerizable unsaturated acid such as poly(meth)acrylic acid, maleic anhydride acid and itaconic acid, esters of these resins (homopolymers or copolymers containing units of a vinyl ester such as vinyl acetate, (meth)acrylic acid ester such as methyl methacrylate or the like) etc.); polymers having an ether bond (polyalkylene oxide, polyoxyalkylene glycol, polyvinyl ether, silicon resin etc.); polymers having an amide bond (N-acylated polyoxazoline and polyalkyleneimine having a >N(COR)— bond (in the formula, R represents hydrogen atom, an alkyl group which may be substituted or an aryl group which may be substituted)); polyvinylpyrrolidine having a >NC(O)— bond and derivatives thereof; polyurethane having a urethane bond; resins having a urea bond and so forth.

Further, a polymer containing silyl group may also be used together with the aforementioned polyvinyl alcohol resins. The polymer containing silyl group comprises a backbone polymer and has at least one, preferably two or more, of silyl groups having a silicon atom bonded to a hydrolyzable group and/or hydroxyl group at ends or side chains in one molecule of the polymer. A preferred structure of the silyl group is represented by the following formula.

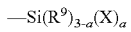

In the above formula, X represents a hydrolyzable group such as a halogen atom, an alkoxy group, an acyloxy group, aminoxy group, phenoxy group, a thioalkoxy group and an amino group and/or a hydroxyl group, $R^9$ represents hydrogen atom, an alkyl group having 1 to 10 carbon atoms or an aralkyl group having 7 to 10 carbon atoms, and a is an integer of 1 to 3.

As the polymers containing silyl group, vinyl polymers containing silyl group whose backbone comprises a vinyl polymer are particularly preferred. In general, these polymers can be readily synthesized by the following methods. However, the method for producing such polymers is not limited to these methods.

(a) A hydrosilane compound is reacted with a vinyl polymer having a carbon-carbon double bond.

(b) A silane compound represented by the following formula:

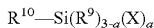

(wherein X, $R^9$ and a have the same meanings as defined above, and $R^{10}$ represents an organic group having a polymerizable double bond) and various vinyl compounds are polymerized.

Examples of the hydrosilane compound used in the production method described in the above (a) include halogenated silanes such as methyldichldrosilane, trichlorosilane and phenyldichlorosilane; alkoxysilanes such as methyldiethoxysilane, methyldimethoxysilane, phenyldimethoxysilane, trimethoxysilane and triethoxysilane; acyloxysilanes such as methyldiacetoxysilane, phenyldiacetoxysilane and triacetoxysilane; and aminosilanes such as methyldiaminoxysilane, triaminoxysilane, dimethylaminoxysilane and triaminosilane.

Further, the vinyl polymers used in the production method described in the above (a) are not particularly limited except that vinyl polymers containing hydroxyl group are excluded. Preferred examples thereof include vinyl polymers obtained by copolymerizing a vinyl compound selected from (meth) acrylate esters such as methyl (meth)acrylate, ethyl (meth) acrylate, butyl (meth)acrylate, isobutyl (meth)acrylate, 2-ethylhexyl (meth)acrylate, benzyl (meth)acrylate and cyclohexyl (meth)acrylate; carboxylic acids such as (meth) acrylic acid, itaconic acid and fumaric acid and acid anhydrides such as maleic anhydride; epoxy compounds such as glycidyl (meth)acrylate; amino compounds such as diethylaminoethyl (meth)acrylate and aminoethyl vinyl ether; amide compounds such as (meth)acrylamide, N-tert-butyl (meth)acrylamide, itaconic acid diamide, α-ethylacrylamide, crotonamide, fumaric acid diamide, maleic acid diamide and N-butoxymethyl(meth)acrylamide; acrylonitrile, styrene, vinyltoluene, α-methylstyrene, vinyl chloride, vinyl acetate, vinyl propionate, N-vinylpyrrolidine etc., with a monomer having a double bond in a side chain such as allyl methacrylate.

Moreover, examples of the silane compound used in the production method described in the above (b) include the compounds described in Japanese Patent Laid-Open Publication (KOKAI) No. 2001-42102, Chemical Formula 5.

Further, as the vinyl compounds used in the production method described in the above (b), the vinyl compounds used for the polymerization of the vinyl polymer in the production method of the above (a) can be used. In addition to those mentioned for the production method described in the above (a), vinyl compounds containing a hydroxyl group such as 2-hydroxyethyl (meth)acrylate, 2-hydroxypropyl (meth)acrylate, 2-hydroxyvinyl ether or N-methylolacrylamide can also be used.

Preferred specific examples of the vinyl polymers containing silyl group described above include acrylic polymers containing trialkoxysilyl group represented by the following formula.

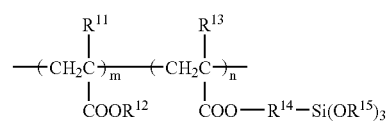

In the above formula, $R^{11}$ and $R^{13}$ represent hydrogen atom, fluorine atom or methyl group, $R^{12}$ represents hydrogen atom, an alkyl group having 1 to 12 carbon atoms (e.g., methyl group, ethyl group, n-propyl group, allyl group, n-butyl group, isobutyl group, n-pentyl group, n-hexyl group), benzyl group, an alkyl group containing a fluorine atom such as $(CF_3)_2CH—$, $CF_3CH_2—$, $C_7F_{15}CH_2—$ and $C_2F_5CH_2CH_2—$, $R^{14}$ represents an alkylene group having 1 to 4 carbon atoms such as methylene group, ethylene group, propylene group and butylene group, $R^{15}$ has the same meaning as $R^1$ mentioned above, and n/(m+n)=0.01 to 0.4, preferably 0.02 to 0.2.

The number average molecular weight of the aforementioned vinyl polymers containing silyl group is preferably 2,000 to 100,000, more preferably 4,000 to 50,000.

Specific examples of the vinyl polymers containing silyl group preferably used in the present invention include Kaneka Zemlac produced by Kaneka Corporation and the following polymers. However, vinyl polymers containing silyl group that can be used in the present invention are not limited to these polymers.

P-1: Methyl methacrylate/γ-acryloxypropyltrimethoxysilane copolymer (80/20 (w/w))

P-2: methyl methacrylate/γ-methacryloxypropyltrimethoxysilane copolymer (85/15 (w/w))

P-3: Methyl methacrylate/ethyl acrylate/γ-methacryloxypropyltrimethoxysilane copolymer (50/40/10 (w/w/w))

P-4: M-1/γ-methacryloxypropyltrimethoxysilane copolymer (90/10 (w/w))

P-5: M-2/γ-methacryloxypropyltrimethoxysilane copolymer (80/20 (w/w))

P-6: M-1/M-3/γ-methacryloxypropyltrimethoxysilane copolymer (50/40/10 (w/w/w))

P-7: Methyl methacrylate/methyl acrylate/y-acryloxypropyltrimethoxysilane copolymer (60/25/15 (w!w/w))

P-8: M-1/methyl methacrylate/γ-methacryloxypropyltrimethoxysilane copolymer (70/25/5 (w/w/w))

The structural formulas of M-1, M-2 and M-3 are as follows.

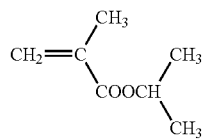

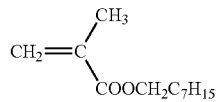

When the polymer containing silyl group is used, it is used in an amount of 1 to 30% by weight, preferably 3 to 10% by weight, more preferably 5 to 10% by weight, based on the polyvinyl alcohol resin.

Further, a monomer may be used together in the sol-gel reaction and polymerized during the sol-gel reaction or thereafter to produce an organic-inorganic hybrid material.

The content of the hydrophilic resin in the aforementioned mixture or the formed coating layer can be represented by the weight of $SiO_2$ or silicon in the same molar number as the alkoxysilane. That is, the content of the hydrophilic resin contained in the mixture is 0.1 times or more, preferably 0.1 to 0.4 time, more preferably 0.1 to 0.25 time, of $SiO_2$ in the same molar number as the alkoxysilane. In the formed coating layer, it is suitable that the content is 0.23 time or more, preferably 0.23 to 0.92 time, more preferably 0.23 to 0.58 time, of the weight of silicon contained in the coating layer.

If the content of the hydrophilic resin is 0.1 time or more of the weight of $SiO_2$ in the same molar number as the alkoxysilane contained in the mixture or 0.23 time or more of the weight of silicon contained in the coating layer, the formed coating layer does not become weak, cracks and defects are unlikely to be generated, and thus good gas barrier ability can be maintained. On the other hand, if the content of the hydrophilic resin is 0.4 time or less of the weight of $SiO_2$ in the same molar number as the alkoxysilane contained in the mixture or 0.92 time or less of the silicon content of the coating layer, the gas barrier ability of the coating layer under a dry atmosphere is favorable, and the gas barrier ability under a high humidity can also be favorable.

The silicon density at 25° C. of the coating layer formed by the production method of the present invention is suitably 0.65 g/cm³ or more, preferably 0.65 to 0.85 g/cm³, more preferably 0.75 to 0.80 g/cm³. The inventors of the present invention found that, besides the content of the hydrophilic resin in the mixture or the coating layer, the silicon density in the coating layer also correlated to the gas barrier ability. That is, they found that, with the aforementioned condition concerning the hydrophilic resin content in the coating layer, a silicon density at 25° C. of 0.65 g/cm³ or more, preferably 0.75 g/cm³ or more, provided a dense film and superior gas barrier property.

The aforementioned silicon density can be obtained by the following method.

A signal strength of Si atoms in a certain area of a thin film is obtained by using an X-ray fluorescence spectrometer, and the coated amount of Si is obtained on a calibration curve of coated amount of Si prepared based on high-frequency induction coupling plasma spectrometry (ICP) measurement. Further, the thickness of the thin film is obtained by scanning electron microscopy (SEM) of a sectional sample slice prepared with a microtome, and Si-coated amount per unit thickness is calculated to obtain a silicon density.

In the production method of the present invention, a desired silicon density can be obtained by suitably adjusting the time required for the steps of coating the aforementioned mixture and drying the solvent.

For example, the reaction time of the alkoxysilane and the acid catalyst from the mixing of the alkoxysilane and the acid catalyst to the start of the step of coating or drying the solvent is preferably 30 seconds to 5 minutes, more preferably 30 seconds to 2 minutes, most preferably 40 seconds to 1 minute, in view of obtaining a high silicon density and high gas barrier property. If the reaction time is 30 seconds or more, alkoxyl groups do not remain in the coating layer, and favorable gas barrier ability can be obtained. Further, if the reaction time is 5 minutes or less, the amount of silanol groups remaining in the coating layer does not increase, and thus favorable gas barrier ability can be maintained.

The inventors of the present invention actually examined whether the gas barrier property of the coating layer to be obtained would be changed with change of the time required until the acid catalyst is neutralized or dried in the formation of the coating layer by coating the aforementioned mixture. That is, the inventors of the present invention measured a ratio of alkoxyl groups remaining in the coating layer of the gas barrier laminate film obtained by the method of the present invention by using $^{13}C$-NMR, and found the aforementioned relation between the acid catalyst amount and the reaction time based on the reaction ratios of alkoxyl groups or silanol groups measured by using $^{29}Si$-NMR. This relation is quite different from the finding concerning the generally known sol-gel reaction of alkoxysilane, and this is a remarkable fact.

Hereafter, the method for coating the mixture on the polymer base film in the production method of the present invention will be explained.

The prepared mixture can be used to form a thin film on the polymer base film by using a coating method such as curtain flow coating, dip coating, spin coating or roll coating. In this case, the timing of hydrolysis may be at any time during the production process. For example, there can be suitably used a method in which a solution having a required composition is used for the hydrolysis and partial condensation to prepare a desired sol solution beforehand, and then it is applied and dried, a method in which a solution having a required composition is prepared and applied and dried while the hydrolysis and partial condensation are simultaneously performed, a method in which, after a solution is coated and primarily dried, a water-containing solution required for the hydrolysis is overlaid to attain the hydrolysis, and so forth. Further, various application methods can be used. When productivity is emphasized, a method in which discharge flow rates of a lower layer coating solution and an upper layer coating solution are adjusted in a slide geeser having multiple discharge ports so that required amounts of the solutions should be obtained, and the formed multilayer flows are continuously placed on a support and dried (simultaneous multilayer coating method) is preferably used.

Although temperature for drying after the coating is not particularly limited so long as it is in such a range that the support should not be deformed, it is preferably 150° C. or lower, more preferably 30 to 150° C., particularly preferably 50 to 130° C.

In order to make the film further denser after the coating and drying, irradiation of energy beam may be performed. Although type of the irradiation beam is not particularly limited, irradiation of ultraviolet rays, electron beams or microwaves can be particularly preferably used in view of influence on deformation and degeneration of a support. The irradiation intensity is 30 to 500 mJ/cm$^2$, particularly preferably 50 to 400 mJ/cm$^2$. The irradiation temperature may be selected from the range of from room temperature to the temperature at which the support begins to deform without any particular limitation, and it is preferably 30 to 150° C., particularly preferably 50 to 130° C.

Hereafter, the gas barrier laminate film of the present invention will be explained.

The gas barrier laminate film of the present invention is obtained by the production method of the present invention described above and has a layer structure comprising a coating layer laminated on a polymer base film.

The thickness of the polymer base film used in the gas barrier laminate film of the present invention is preferably 5 to 500 µm, more preferably 5 to 200 µm, still more preferably 10 to 100 µm. If the polymer base film is unduly thin, strength becomes insufficient, and handling becomes difficult. If the film is unduly thick, transparency and flexibility tend to be degraded.

The thickness of the coating layer of the gas barrier laminate film of the present invention is preferably 100 to 1000 nm, more preferably 300 to 800 nm. If the coating layer is unduly thin, the gas barrier property is degraded. If the coating layer is unduly thick, transparency tends to be degraded, and cracks tend to occur, resulting in easy breakage.

The gas barrier laminate film of the present invention may further have an inorganic thin film layer on the coating layer. The inorganic thin film layer is preferably an inorganic vapor deposition layer or a dense inorganic coating thin film obtained by the sol-gel method. The inorganic vapor deposition layer is preferably a vapor deposition layer of silica, zirconia, alumina or the like. The inorganic vapor deposition layer can be formed by vacuum vapor deposition, sputtering method or the like.

[Substrate]

The substrate of the present invention comprises the gas barrier laminate film of the present invention. The substrate of the present invention can be used as, for example, a substrate for display device, substrate for electronic circuit or the like. When the substrate of the present invention is used as a substrate for display device, electrodes, dielectric layer, protective layer, partitions, fluorophore and so forth can be formed on the gas barrier laminate film to obtain a member for display device, and displays such as PDP, PALC, FED and VFD can be further produced by using the member. When the substrate of the present invention is used as a substrate for electronic circuit, a circuit can be formed on the gas barrier laminate film to produce an electronic circuit used for various kinds of electronic equipments and semiconductor devices. Further, the gas barrier laminate film of the present invention can also be used as a sealing material.

[Image Display Device]

The image display device of the present invention is a liquid crystal device, organic EL device or the like having the gas barrier laminate film or substrate of the present invention.

The organic EL device of the present invention is preferably used according to any of the embodiments described in Japanese Patent Laid-open Publication (KOKAI) Nos. 11-335661, 11-335368, 2001-192651, 2001-192652, 2001-192653, 2001-335776, 2001-247859, 2001-181616 and 2001-181617, Japanese Patent Application Nos. 2001-58834, 2001-58835, 2001-89663 and 2001-334858.

That is, in an organic EL device having the gas barrier laminate film of the present invention, the gas barrier laminate film of the present invention can be used as a base film and/or a protective film. When the gas barrier film of the present invention is used in an organic EL device, it is preferable to coat the coating layer on the EL layer side, i.e., the side that is not brought into contact with outside air.

The gas barrier laminate film of the present invention and the substrate comprising the gas barrier laminate film are especially useful as electrode substrates of image display devices such as liquid crystal display devices and organic EL devices. In addition, they can also be applied to, for example, electrode substrates also serving as polarizing plates, electrode substrate also serving as phase plates, films with transparent electrodes for touch panels, electromagnetic wave-shielding plates for CRT, plasma display panels (PDP), backlights, light guide panels, color filters, optical guards, optical tapes, optical discs, covers and active devices of solar cells and so forth. Furthermore, they can also be applied to packaging materials for drugs, foodstuffs and so forth.

EXAMPLES

The present invention will be further specifically explained with reference to the following examples of the present invention. The materials, amounts, ratios, types and procedures of treatments and so forth shown in the following examples can be suitably changed unless such changes depart from the spirit of the present invention. Accordingly, the scope of the present invention should not be construed as limited to the following specific examples.

Example 1

(Preparation of Support)

ZEONOA 16-100R (cycloolefin polymer film produced by Nippon Zeon) was subjected to a corona discharge treatment to prepare Support A for coating.

Further, ZEONOA 1600R (cycloolefin polymer produced by Nippon Zeon) was mixed per 100 parts by weight with 10 parts by weight of Somasif MTE (synthetic mica produced by CO-OP CHEMICAL), kneaded and extruded at 270° C. by using a double screw extruder (Rheomix 600P/PTW25, HAAKE, Germany) to obtain a film having a thickness of 100 µm, and the surface of the film was subjected to a corona discharge treatment to prepare Support B for coating.

(Formation of Organic-Inorganic Hybrid Coating Layer by Sol-Gel Method)

A mixture of 4.17 g of tetraethoxysilane, 3.7 g of isopropanol and 0.52 g of water was added with 1.7 ml of 2 mol/L hydrochloric acid and stirred at room temperature for 1 minute. The whole amount of this reaction mixture was added to 7.45 g of 4 weight % solution of polyvinyl alcohol prepared beforehand (prepared by dissolving PVA124C produced by Kuraray Co., Ltd. in a mixed solvent of water:isopropanol=65:35 (weight ratio)) and stirred for 1 minute. This mixture was applied to Supports A and B for coating mentioned above by using a wireless bar. Then, the mixture was immediately dried at 120° C. for 5 minutes to obtain an organic-inorganic hybrid coating layer having a thickness of about 100 nm and thereby obtain Sample 1.

Examples 2 to 11

Samples 2 to 11 were prepared in the same manner as Example 1 except that the amount of acid catalyst and the time from addition of the acid catalyst to the start of the coating step were changed as mentioned in Table 1.

Comparative Examples 1 to 5

(Preparation of Gas Barrier Laminate Film for Comparison)

Comparative Samples 1 to 5 were prepared in the same manner as Example 1 except that the amount of acid catalyst and the time from addition of the acid catalyst to the start of the coating step were changed as mentioned in Table 1.

Test Example 1

Measurement Test of Silicon Density

The silicon density was measured by using X-ray fluorescence spectrometer. The calibration curve was prepared by using a $SiO_2$ sputtering film having a known deposition amount.

The density of silicon contained in the coating layer alone could be determined by carrying out X-ray fluorescence spectrometry for the support alone and subtracting the result from the result obtained from each sample. The results are shown in Table 1.

Test Example 2

Measurement Test of Gas Barrier Property

The gas permeability of each of the gas barrier laminate films produced in Examples 1 to 11 and Comparative Examples 1 to 5 was measured by the MOCON method. The oxygen permeability was measured under conditions of 23° C. and 0% or 90% of relative humidity. The water vapor permeability was measured under conditions of 23° C. and 90% of relative humidity. The results are shown in Table 2.

TABLE 1

| | Sample | Support | Amount of acid catalyst (ratio to TEOS in mol Eq) | Type of acid catalyst | Weight ratio of added polyvinyl alcohol to alkoxysilane (as $SiO_3$) | Weight ratio of polyvinyl alcohol resin to silicon | Time from addition of acid catalyst to coating step (minute) | 25° C. Si density (g/cm$^3$) |
|---|---|---|---|---|---|---|---|---|
| Example 1 | 1 | A | 1 | Hydrochloric acid | 0.25 | 0.68 | 2 | 0.80 |
| Example 2 | 2 | B | 1 | Hydrochloric acid | 0.25 | 0.58 | 2 | 0.80 |
| Example 3 | 3 | A | 0.5 | Hydrochloric acid | 0.25 | 0.58 | 2 | 0.79 |
| Example 4 | 4 | A | 0.3 | Hydrochloric acid | 0.25 | 0.68 | 2 | 0.76 |
| Example 5 | 5 | A | 2 | Hydrochloric acid | 0.25 | 0.58 | 2 | 0.81 |
| Example 6 | 6 | A | 1 | Hydrochloric acid | 0.25 | 0.58 | 1.5 | 0.78 |
| Example 7 | 7 | A | 1 | Hydrochloric acid | 0.25 | 0.58 | 3 | 0.77 |
| Example 8 | 8 | A | 1 | Acetic acid | 0.25 | 0.68 | 2 | 0.78 |
| Example 9 | 9 | A | 1 | Hydrochloric acid | 0.25 | 0.58 | 2 | 0.68 |
| Example 10 | 10 | A | 1 | Hydrochloric acid | 0.05 | 0.58 | 2 | 0.76 |
| Example 11 | 11 | A | 1 | Hydrochloric acid | 0.12 | 0.23 | 2 | 0.85 |
| Comparative Example 1 | Comparative Sample 1 | A | 0.1 | Hydrochloric acid | 0.25 | 0.58 | 2 | 0.72 |
| Comparative Example 2 | Comparative Sample 2 | B | 0.1 | Hydrochloric acid | 0.25 | 0.58 | 2 | 0.72 |
| Comparative Example 3 | Comparative Sample 3 | A | 0.01 | Hydrochloric acid | 0.25 | 0.58 | 2 | 0.89 |
| Comparative Example 4 | Comparative Sample 4 | A | 0.01 | Hydrochloric acid | 0.25 | 0.58 | 30 | 0.71 |
| Comparative Example 5 | Comparative Sample 5 | A | Large excess | Acidic cation resin*[1] | 0.25 | 0.58 | 2 | 0.72 |

*[1]Filtered immediately before coating

TABLE 2

| | Sample | Oxygen permeability (ml/m$^2$ · day · atm) 28° C. 0% RH | Oxygen permeability (ml/m$^2$ · day · atm) 28°C. 90% RH | Water vapor permeability (g/m$^3$ · day) | Surface condition |
|---|---|---|---|---|---|
| Example 1 | 1 | 0.02 or lower | 0.02 or lower | 0.02 or lower | Good |
| Example 2 | 2 | 0.02 or lower | 0.02 or lower | 0.02 or lower | Good |
| Example 3 | 3 | 0.06 | 0.08 | 0.08 | Good |
| Example 4 | 4 | 0.08 | 0.15 | 0.12 | Good |
| Example 5 | 5 | 0.09 | 0.1 | 0.12 | Good |
| Example 6 | 6 | 0.04 | 0.08 | 0.06 | Good |
| Example 7 | 7 | 0.08 | 0.08 | 0.07 | Good |
| Example 8 | 8 | 0.08 | 0.04 | 0.04 | Good |
| Example 9 | 9 | 0.05 | 0.06 | 0.05 | Good |
| Example 10 | 10 | 0.05 | 0.07 | 0.06 | Good |
| Example 11 | 11 | 0.13 | 0.13 | 0.12 | Good |
| Comparative Example 1 | Comparative Sample 1 | 0.15 | 2.5 | 0.31 | Good |
| Comparative Example 2 | Comparative Sample 2 | 0.19 | 0.52 | 0.10 | Good |

TABLE 2-continued

| Sample | | Oxygen permeability (ml/m² · day · atm) | | Water vapor permeability (g/m³ · day) | Surface condition |
|---|---|---|---|---|---|
| | | 28° C. 0% RH | 28°C. 90% RH | | |
| Comparative Example 3 | Comparative Sample 3 | 0.35 | 15.8 | 0.40 | Good |
| Comparative Example 4 | Comparative Sample 4 | 0.18 | 0.35 | 0.22 | Good |
| Comparative Example 5 | Comparative Sample 5 | 0.17 | 152 | 0.42 | Good |
| Reference Example 1 | Support A | 296 | 343 | 0.41 | Good |
| Reference Example 2 | Support B | 0.6 | 0.64 | 0.10 | Good |

As seen from Table 1 and 2, when hydrochloric acid (acid catalyst) was contained in the mixed solution in an amount of 0.3 molar equivalent or more with respect to 1 molar equivalent of tetraethoxysilane (alkoxysilane) in the preparation of gas barrier laminate films, all of the samples exhibited favorable oxygen permeability (23° C., 90% RH: 0.15 ml/m²·day·atm or lower) and favorable water vapor permeability (0.12 ml/m²·day·atm or lower) (Examples 1 to 11). Among them, the gas barrier laminate films of which silicon density in the coating layer at 25° C. was 0.75 g/cm³ or more exhibited good oxygen permeability and water vapor permeability.

However, when the added amount of hydrochloric acid (acid catalyst) in the mixed solution was less than 0.3 mol equivalent with respect to 1 mol equivalent of tetraethoxysilane (alkoxysilane) (Comparative Examples 1 to 4), the oxygen permeability and water vapor permeability of the obtained gas barrier laminate films were larger than those of the examples according to the present invention. Further, in the sample in which a large excess amount of acid catalyst was added (Comparative Example 5), the oxygen permeability and water vapor permeability were considerably decreased.

Thus, it can be seen that the gas barrier laminate films obtained by a method satisfying the conditions according to the present invention exhibited gas barrier ability, especially superior gas barrier ability and superior corrosion resistance even under a high humidity environment, and dense coating layers were formed in them.

Example 12

(Production of Organic EL Device)

Sample 1 was introduced into a vacuum chamber, and a transparent electrode made of an IXO thin film having a thickness of 0.2 μm was formed by DC magnetron sputtering using an IXO target. An aluminum lead wire was connected to the transparent electrode (IXO) to form a laminated structure.

An aqueous dispersion of polyethylene dioxythiophene/polystyrene sulfonic acid (Baytron P, BAYER, solid content: 1.3 weight %) was applied on the surface of the transparent electrode by spin coating and vacuum-dried at 150° C. for 2 hours to form a hole transporting organic thin film layer having a thickness of 100 nm. This was designated as Substrate X.

Further, a coating solution for a light-emitting organic thin film layer having the following composition was applied on one side of a temporary support made of polyethersulfone having a thickness of 188 μm (SUMILITE FS-1300, Sumitomo Bakelite) by using a spin coater and dried at room temperature to form a light-emitting organic thin film layer having a thickness of 13 nm on the temporary support. This was designated as Transfer Material Y.

| | |
|---|---|
| Polyvinyl carbazole (Mw = 63000, Aldrich) | 40 parts by weight |
| Tris(2-phenylpyridine)iridium complex (ortho-metalated complex) | 1 part by weight |
| Dichloroethane | 3200 parts by weight |

The light-emitting organic thin film layer side of Transfer Material Y was overlaid on the upper surface of the organic thin film layer of Substrate X, heated and pressurized at 160° C., 0.3 MPa and 0.05 m/min by using a pair of heat rollers, and the temporary support was delaminated to form a light-emitting organic thin film layer on the upper surface of Substrate X. This was designated as Substrate XY.

Further, a patterned mask for vapor deposition (mask providing a light-emitting area of 5 mm×5 mm) was set on one side of a polyimide film (UPILEX-50S, Ube Industries) cut into a 25-mm square and having a thickness of 50 μm, and Al was vapor-deposited in an atmosphere under reduced pressure of about 0.1 mPa to form an electrode having a film thickness of 0.3 μm. $Al_2O_3$ was vapor-deposited in the same pattern as that of the Al layer by DC magnetron sputtering using an $Al_2O_3$ target to obtain a film thickness of 3 nm. An aluminum lead wire was connected to the Al electrode to form a laminated structure. A coating solution for an electron transporting organic thin film layer having the following composition was applied on the obtained laminated structure by using a spin coater and vacuum-dried at 80° C. for 2 hours to form an electron transporting organic thin film layer having a thickness of 15 nm on LiF. This was designated as Substrate Z.

| | |
|---|---|
| Polyvinyl butyral (MW = 2000, 2000L produced by Denki Kagaku Kogyo) | 10 parts by weight |
| Electron transporting compound having the following structure | 20 parts by weight |

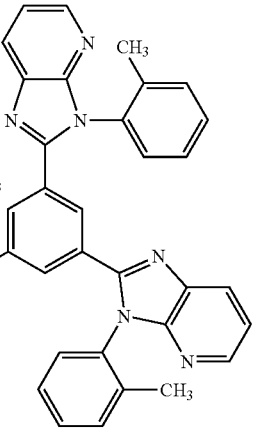

| | |
|---|---|
| 1-Butanol | 3500 parts by weight |

Substrate XY and Substrate Z were stacked so that the electrodes should face each other via the light-emitting organic thin film layer between them, heated and pressurized at 160° C., 0.3 MPa and 0.05 m/min by using a pair of heat rollers to obtain Organic EL Device 1.

Examples 13 to 22

Organic EL Devices 2 to 11 were obtained in the same manner as in Example 12 except that Samples 2 to 11 were used instead of Sample 1 in the preparation of Substrate X.

Comparative Examples 6 to 10

Comparative Organic EL Device Samples 1 to 5 were obtained in the same manner as in Example 12 except that Comparative Samples 1 to 5 were used instead of Sample 1 in the preparation of Substrate X.

Reference Examples 3 and 4

Organic EL Device Samples A and B were obtained in the same manner as in Example 12 except that Support A and B for coating were used instead of Sample 1 in the preparation of Substrate X.

Test Example 3

Performance Test of Organic EL Device

DC voltage was applied to the obtained Organic EL Device Samples 1 to 11, Comparative Organic EL Device Samples 1 to 5, Organic EL Device Samples A and B by using Source-Measure Unit Type 2400 (Toyo Corporation), and light emission was observed.

After the devices were stored under an environment of 40° C., 90% RH for one month, light emission was similarly observed. The results are shown in Table 3.

TABL 3

| | Organic EL device sample | Light emission immediately after preparation of sample | Light emission after storage at 40° C., 90% RH for 1 month |
|---|---|---|---|
| Example 12 | 1 | Good | Good |
| Example 13 | 2 | Good | Good |
| Example 14 | 3 | Good | Fairly good |
| Example 15 | 4 | Good | Fairly good |
| Example 16 | 5 | Good | Good |
| Example 17 | 6 | Good | Good |
| Example 18 | 7 | Good | Good |
| Example 19 | 8 | Good | Fairly good |
| Example 20 | 9 | Good | Fairly good |
| Example 21 | 10 | Good | Fairly good |
| Example 22 | 11 | Good | Fairly good |
| Comparative Example 6 | Comparative Sample 1 | Fairly good | Bad (many defects) |
| Comparative Example 7 | Comparative Sample 2 | Good | Bad (many defects) |
| Comparative Example 8 | Comparative Sample 3 | Fairly good | Bad (many defects) |
| Comparative Example 9 | Comparative Sample 4 | Fairly good | Bad (many defects) |
| Comparative Example 10 | Comparative Sample 5 | Fairly good | Bad (many defects) |
| Reference Example 3 | Support A | Bad (many defects) | Bad (no light emission) |
| Reference Example 4 | Support B | Good | Bad (defects are generated) |

As seen from Table 3, conditions after storage of the organic EL devices having the gas barrier laminate films of the present invention were favorable even after the storage for 1 month under the high temperature and high humidity environment. On the other hand, although Comparative Organic EL Device Samples 1 to 5 exhibited favorable light emission immediately after the preparation, they did not exhibit favorable light emission after the storage for 1 month under the high temperature and high humidity environment. From the above, it can be seen that the organic EL devices according to the present invention exhibit high durability even under a high temperature and high humidity environment.

Experiments similar to the aforementioned examples were further conducted by using a poly(2-methyl-2-oxazoline) resin, poly(N-vinylpyrrolidone) resin and poly(N,N-dimethylacrylamide) resin instead of the polyvinyl alcohol. As a result, favorable results were also obtained with all of the resins as with the polyvinyl alcohol resin.

As explained above, in the method for producing a gas barrier laminate film of the present invention, a mixture containing at least one kind of alkoxysilane, an acid catalyst in an amount of 0.3 to 5.0 molar equivalents with respect to 1 molar equivalent of the alkoxysilane and a hydrophilic resin is applied to a polymer base film. Thanks to this characteristic, a dense and transparent gas barrier laminate film exhibiting superior gas barrier ability can be provided by the production method of the present invention. Further, if the gas barrier laminate film of the present invention is used, precise and highly durable substrate, liquid crystal device, organic EL device and so forth can be provided.

The present disclosure relates to the subject matter contained in Japanese Patent Application No. 010939/2003 filed on Jan. 20, 2003, which is expressly incorporated herein by reference in its entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A method for producing a gas barrier laminate film comprising the step of applying a mixture containing at least one kind of alkoxysilane, an acid catalyst and a hydrophilic resin to a polymer base film to form a coating layer, wherein the acid catalyst is contained in the mixture in an amount of 0.3 to 5.0 molar equivalents with respect to 1 molar equivalent of the alkoxysilane, and the polymer base film contains an inorganic layered compound.

2. The method for producing a gas barrier laminate film according to claim 1, wherein the hydrophilic resin is a polyvinyl alcohol resin.

3. The method for producing a gas barrier laminate film according to claim 1, wherein the hydrophilic resin is contained in the mixture in an amount of 0.1 time or more of the weight of $SiO_2$ in the same molar number as the alkoxysilane.

4. The method for producing a gas barrier laminate film according to claim 1, wherein the acid catalyst is hydrochloric acid, nitric acid, formic acid, acetic acid or oxalic acid.

5. The method for producing a gas barrier laminate film according to claim 1, wherein the inorganic layered compound is fluorine tetrasilicon mica.

6. The method for producing a gas barrier laminate film according to claim 1, wherein the polymer base film is prepared from a resin kneaded with an inorganic layered compound.

7. The method for producing a gas barrier laminate film according to claim 1, wherein the polymer base film has a light transmission of 80% or more.

8. The method for producing a gas barrier laminate film according to claim 1, wherein the polymer base film has a thickness of 5 to 500 µm.

9. The method for producing a gas barrier laminate film according to claim 1, wherein the coating layer has a thickness of 100 to 1000 nm.

10. The method for producing a gas barrier laminate film according to claim 1, wherein the acid catalyst is contained in the mixture in an amount of 0.5 to 2.5 molar equivalents with respect to 1 molar equivalent of the alkoxysilane.

11. A gas barrier laminate film, which can be obtained by the production method according to claim 1.

12. The gas barrier laminate film according to claim 11, wherein the coating layer has a silicon density of 0.65 $g/cm^3$ or more at 25° C.

13. The gas barrier laminate film according to claim 11, wherein the coating layer has a silicon density of 0.75 $g/cm^3$ or more at 25° C.

14. The gas barrier laminate film according to claim 11, wherein the coating layer contains a polysilicate.

15. The gas barrier laminate film according to claim 11, wherein the coating layer contains the hydrophilic resin in an amount of 0.23 time or more of the weight of silicon contained in the coating layer.

16. A substrate comprising the gas barrier laminate film according to claim 11.

17. An image display device comprising the gas barrier laminate film according to claim 11.

18. A liquid crystal display device comprising the gas barrier laminate film according to claim 11.

19. An organic EL device comprising the gas barrier laminate film according to claim 11.

* * * * *